UNITED STATES PATENT OFFICE.

KARL SCHLATTER, OF PERTH AMBOY, NEW JERSEY.

OXIDATION PRODUCT OF CUMARIN AND INDENE.

1,294,836.  Specification of Letters Patent.  Patented Feb. 18, 1919.

No Drawing.  Application filed June 27, 1916. Serial No. 106,117.

*To all whom it may concern:*

Be it known that I, KARL SCHLATTER, a citizen of the United States, and a resident of Perth Amboy, in the county of Middlesex and State of New Jersey, have invented certain new and useful Improvements in Oxidation Products of Cumarin and Indene, of which the following is a specification.

My invention relates to cumarin and indene compounds and refers particularly to compounds produced by the oxidation of cumarin and indene and a process for producing the same.

I have found that when cumarin or indene is oxidized, there result products which have valuable properties and which are adaptable for a number of important uses.

The products thus resulting are suitable for the preparation of valuable primers and paints, possessing the property of preventing or retarding rust upon metallic surfaces to which they are applied and that such primers and paints possess rapidly drying properties and further possess an elastic property and hence are not readily cracked, chipped or broken.

I have further found that such oxidized products possess highly developed heat resisting properties and hence are suitable for heat insulators; that they possess water resisting properties and hence are suitable for waterproofing purposes, and that they possess the property of valuable electric insulators.

If the oxidized compounds of cumarin and indene are converted into primers or paints, such primers or paints are particularly adapted for the painting or coating of metallic surfaces to prevent, or retard, the natural inclination of the metal to rust, and on account of their water-proof property can be advantageously employed as a floor paint, wall covering or varnish or as a lacquer.

The solution of these oxidized compounds in a volatile solvent is valuable for the treatment of textile fabrics, paper, papier mâché, wood, leather and other substances for the production of water-proof materials, the elastic properties of the compounds allowing of their extended application for this purpose.

If the solutions of the oxidized compounds and a drier are intimately incorporated with substances to act as fillers, as asbestos, sawdust, cork, leather dust, rubber, &c., a plastic material is produced, which, when dry, can be used as insulation against heat or electricity, depending upon the particular filler employed.

These and other uses for the oxidized compounds of my invention will be evident upon a consideration of my specification and claims and of the properties of the compounds produced thereby.

The oxidation of the cumarin and indene can be accomplished by my process by employing any suitable oxidizing agent, among which are potassium permanganate and sulfuric acid, chromic acid, chromyl chlorid, &c.

I have found that this oxidation can be accomplished with or without the presence of gums and oils, or with a mixture of gums and oils.

Another valuable feature of my invention is that the oxidized products can be produced by my process at ordinary temperatures, and without the application of high temperatures, except where it is desired to dissolve the gums in an oil, in which case the gums are fused and the oil added and the solution then cooled. This heating, however, is not a step in my actual process but simply a step in the production of one of the ingredients of my process.

By "cumarin", "cumarin group", "indene" and "indene group", wherever they occur in this specification and the accompanying claims, I means cumarin, cumarin sludge, and indene and indene sludge, and their polymerization derivatives and their para compounds, alone or in mixtures.

By "oils", I mean Chinese wood oil, linseed oil, soy bean oil, or any other vegetable oil that may be suitably employed in my process.

By "gums", I mean resins, dammar, mastic, copal or any other gum that may be suitably employed in my process.

By "chromium compound" I mean a compound of chromium which will react upon cumarin and indene to produce an oxidized compound, among which I have thus far found chromyl chlorid to be the most satisfactory.

By "oxidized compounds" of cumarin and indene, I mean those compounds which are produced by oxidation alone and by oxidation and chlorination.

By "oxidizing agents" I mean those substances which will oxidize the cumarin and indene, producing compounds having the properties described in this specification.

In a general way my process is as follows: I form a solution of the cumarin or indene, either with or without oils and gums, by means of a suitable solvent, among which are carbon tetrachlorid, carbon disulfid, tetrachlorethane and other compounds having solvent effect upon the ingredients of the process. If gum is used, it can be first fused and then dissolved by means of any solvent suitable for the formation of a concentrated solution of the particular gum employed. I next produce a solution of the oxidizing agent. In the case of chromyl chlorid, it may be dissolved in carbon tetrachlorid, carbon disulfid, tetrachlorethane, &c.

I now add the solution of the oxidizing agent slowly to the solution of cumarin or indene, at a medium temperature, the temperature varying with the character and quantity of ingredients, the mixture being thoroughly stirred.

It will thus be seen that my process is simple in application, economical in cost and readily followed.

The following examples will illustrate some methods of producing the primers or paints of my invention.

Example 1: 100 lbs. cumarin are dissolved in 150 lbs. carbon tetrachlorid. At a medium temperature, add, slowly and with constant stirring, a solution of 4 lbs. chromyl chlorid in 50 lbs. carbon tetrachlorid.

Example 2: 100 lbs. Chinese wood oil are added to a solution of 25 lbs. cumarin dissolved in 50 lbs. carbon tetrachlorid, and the mixture diluted with 80 lbs. carbon tetrachlorid. Add, at a medium temperature with constant stirring, a solution of 5 lbs. chromyl chlorid in 50 lbs. carbon tetrachlorid.

Example 3: Dissolve 50 lbs. cumarin in 100 lbs. carbon tetrachlorid. Dissolve 50 lbs. dammar gum in 500 lbs. linseed oil. Mix the solutions of cumarin and gum and stir thoroughly. To the mixture thus formed, add, at a medium temperature with constant stirring, a solution of 10 lbs. chromyl chlorid in 125 lbs. carbon tetrachlorid.

Example 4: Dissolve 250 lbs. cumarin in 500 lbs. carbon tetrachlorid. Fuse 250 lbs. dammar gum and dissolve in 250 lbs. turpentine and allow to cool. Thoroughly mix the solutions of gum and cumarin, and at a medium temperature, add, with constant stirring, a solution of 20 lbs. chromyl chlorid in 250 lbs. carbon tetrachlorid.

All of the oxidizing reactions mentioned above can be obtained at a temperature considerably below 100° C.

I do not limit myself to the particular chemicals, amounts, strengths, temperatures and order of procedure mentioned and described herein, all of which may be varied without going beyond the scope of my invention as described and claimed.

What is claimed is:

1. The process which comprises treating a solution of a member of the cumarin and indene groups with an oxidizing agent in the presence of an oil.

2. The process which comprises treating a solution of a member of the cumarin and indene groups with an oxidizing agent in the presence of a gum.

3. The process which comprises treating a solution of a member of the cumarin and indene groups with an oxidizing agent in the presence of an oil and a gum.

4. The process which comprises reacting upon a solution of a member of the cumarin and indene groups with a solution of chromyl chlorid.

5. The process which comprises reacting upon a solution of a member of the cumarin and indene groups with a solution of chromyl chlorid in the presence of an oil.

6. The process which comprises reacting upon a solution of a member of the cumarin and indene groups with a solution of chromyl chlorid in the presence of a gum.

7. The process which comprises reacting upon a solution of a member of the cumarin and indene groups with a solution of chromyl chlorid in the presence of an oil and a gum.

8. As a new article of manufacture, the oxidized product producible by treating a member of the cumarin and indene groups with chromyl chlorid.

9. As a new article of manufacture, the product comprising an oxidized compound of a member of the cumarin and indene groups, a volatile solvent, and an oil.

10. As a new article of manufacture, the product comprising an oxidized compound of a member of the cumarin and indene groups, a volatile solvent, and a gum.

11. As a new article of manufacture, the product comprising an oxidized compound of a member of the cumarin and indene groups, a volatile solvent, a gum, and an oil.

Signed at New York city, in the county of New York and State of New York, this 22nd day of June 1916.

KARL SCHLATTER.

Witnesses:
RITA LYNCH,
TERESA V. LYNCH.